(12) United States Patent
Abotabl et al.

(10) Patent No.: US 11,765,705 B2
(45) Date of Patent: Sep. 19, 2023

(54) METHODS AND APPARATUS FOR CONFIGURING RB SETS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 17/406,795

(22) Filed: Aug. 19, 2021

(65) Prior Publication Data

US 2022/0086837 A1    Mar. 17, 2022

Related U.S. Application Data

(60) Provisional application No. 63/079,728, filed on Sep. 17, 2020.

(51) Int. Cl.
*H04W 72/04* (2023.01)
*H04L 5/00* (2006.01)
*H04W 72/10* (2009.01)
*H04W 72/0453* (2023.01)
*H04W 72/23* (2023.01)

(52) U.S. Cl.
CPC ....... *H04W 72/0453* (2013.01); *H04L 5/0048* (2013.01); *H04W 72/23* (2023.01)

(58) Field of Classification Search
CPC ............ H04W 72/0453; H04W 72/042; H04L 5/0048
See application file for complete search history.

(56) References Cited

U.S. PATENT DOCUMENTS

2022/0124807 A1* 4/2022 Hu ...................... H04W 74/006
2022/0201672 A1* 6/2022 Tomeba ................ H04W 16/28
2022/0272755 A1* 8/2022 Lin .................... H04W 74/0866

* cited by examiner

*Primary Examiner* — Ronald B Abelson
(74) *Attorney, Agent, or Firm* — ArentFox Schiff LLP

(57) ABSTRACT

Aspects of the present disclosure include methods, apparatuses, and computer readable media for receiving a first plurality of bits indicating availabilities of a plurality of resource block (RB) sets, receiving a second plurality of bits indicating transmission directions associated with the plurality of RB sets, and transmitting or receiving information via at least one of the plurality of RB sets based on the first plurality of bits and the second plurality of bits.

27 Claims, 7 Drawing Sheets

METHODS AND APPARATUS FOR CONFIGURING RB SETS

CROSS REFERENCE TO RELATED APPLICATIONS

The current application claims priority to, and the benefit of, U.S. Provisional Application No. 63/079,728, filed on Sep. 17, 2020, and entitled "METHODS AND APPARATUS FOR CONFIGURING RB SETS," the contents of which are hereby incorporated by reference in their entireties.

BACKGROUND

Aspects of the present disclosure relate generally to wireless communications, and more particularly, to apparatuses and methods for configuring resource block (RB) sets.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a base station (BS) may allocate resources (e.g., symbols and/or slots) to a user equipment (UE) for a full-duplex (FD) communication operation, such as in-band FD (IBFD) or sub-band FD operations. However, in an unlicensed band, the BS may lack the ability to signal the UE for FD operations. Specifically, the BS may lack the ability to signal to the UE configurations for the RB sets used for FD operations. Therefore, improvements in signaling may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a user equipment (UE) for receiving a first plurality of bits indicating availabilities of a plurality of resource block (RB) sets, receiving a second plurality of bits indicating transmission directions associated with the plurality of RB sets, and transmitting or receiving information via at least one of the plurality of RB sets based on the first plurality of bits and the second plurality of bits.

Other aspects of the present disclosure include a user equipment (UE) having a memory comprising instructions, a transceiver, and one or more processors operatively coupled with the memory and the transceiver, the one or more processors configured to execute instructions in the memory to receive a first plurality of bits indicating availabilities of a plurality of resource block (RB) sets, receive a second plurality of bits indicating transmission directions associated with the plurality of RB sets, and transmit information via at least one of the plurality of RB sets based on the first plurality of bits and the second plurality of bits.

An aspect of the present disclosure includes a user equipment (UE) including means for receiving a first plurality of bits indicating availabilities of a plurality of resource block (RB) sets, means for receiving a second plurality of bits indicating transmission directions associated with the plurality of RB sets, and means for transmitting or receiving information via at least one of the plurality of RB sets based on the first plurality of bits and the second plurality of bits.

Some aspects of the present disclosure include non-transitory computer readable media having instructions stored therein that, when executed by one or more processors of a user equipment (UE), cause the one or more processors to receive a first plurality of bits indicating availabilities of a plurality of resource block (RB) sets, receive a second plurality of bits indicating transmission directions associated with the plurality of RB sets, and transmit or receive information via at least one of the plurality of RB sets based on the first plurality of bits and the second plurality of bits.

Aspects of the present disclosure include methods by a base station (BS) for determining a first plurality of bits indicating availabilities of a plurality of resource block (RB) sets, transmitting the first plurality of bits indicating availabilities of a plurality of resource block (RB) sets, determining a second plurality of bits indicating transmission directions associated with the plurality of RB sets, transmitting the second plurality of bits indicating transmission directions associated with the plurality of RB sets, and transmitting or receiving information via at least one of the plurality of RB sets based on the first plurality of bits and the second plurality of bits Other aspects of the present disclosure include a base station (BS) having a memory comprising instructions, a transceiver, and one or more processors operatively coupled with the memory and the transceiver, the one or more processors configured to execute instructions in the memory to determine a first plurality of bits indicating availabilities of a plurality of resource block (RB) sets, transmit the first plurality of bits indicating availabilities of a plurality of resource block (RB) sets, determine a second plurality of bits indicating transmission directions associated with the plurality of RB sets, transmit the second plurality of bits indicating transmission directions associated with the plurality of RB sets, and transmit or receive information via at least one of the plurality of RB sets based on the first plurality of bits and the second plurality of bits.

Some aspects of the present disclosure include non-transitory computer readable media having instructions stored therein that, when executed by one or more processors of a user equipment (UE), cause the one or more processors to determine a first plurality of bits indicating availabilities of a plurality of resource block (RB) sets, transmit the first plurality of bits indicating availabilities of a plurality of resource block (RB) sets, determine a second plurality of bits indicating transmission directions associated with the plurality of RB sets, transmit the second plurality of bits indicating transmission directions associated with the plurality of RB sets, and/or transmit information via at least one of the plurality of RB sets based on the first plurality of bits and the second plurality of bits.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
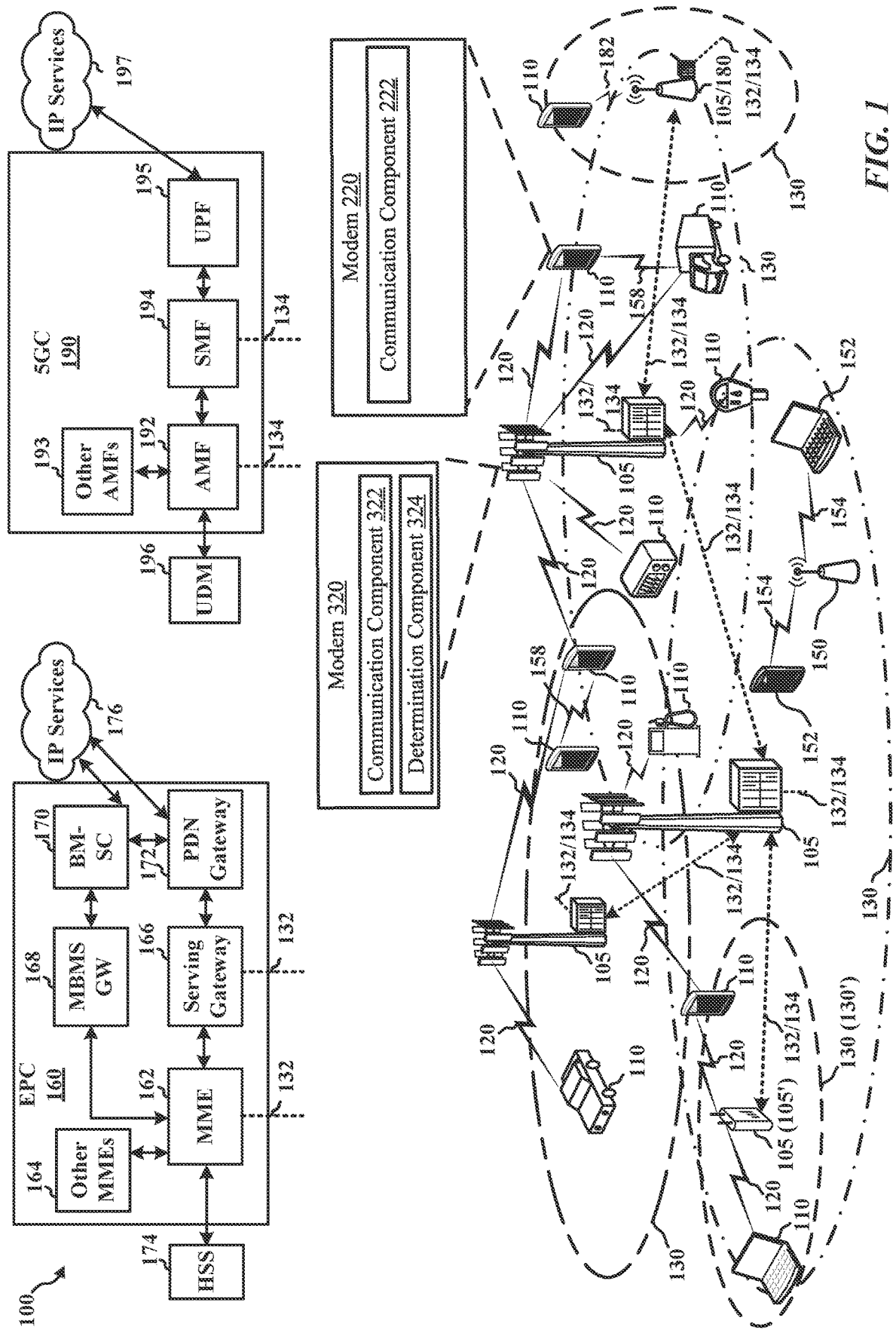
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In one implementation, the base station (BS) may transmit one or more bits of a bitmap to a user equipment (UE). The one or more bits in the bitmap may indicate the available resources, such as resource block (RB) sets, in an unlicensed band. The one or more bits may also indicate to the UE the transmission direction (transmit (TX) or receive (RX)) of the RB sets. The UE may receive the bitmap and communicate with the BS based on the indication provided in the bitmap.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. In some implementations, the communication component 222 may be implemented using hardware, software, or a combination of hardware and software. In some implementations, the BS 105 may include a communication component 322 configured to communicate with the UE 110. The BS 105 may include a determination component 324 configured to determine the configuration of the RB set. In some implementations, the communication component 322 and/or the determination component 324 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
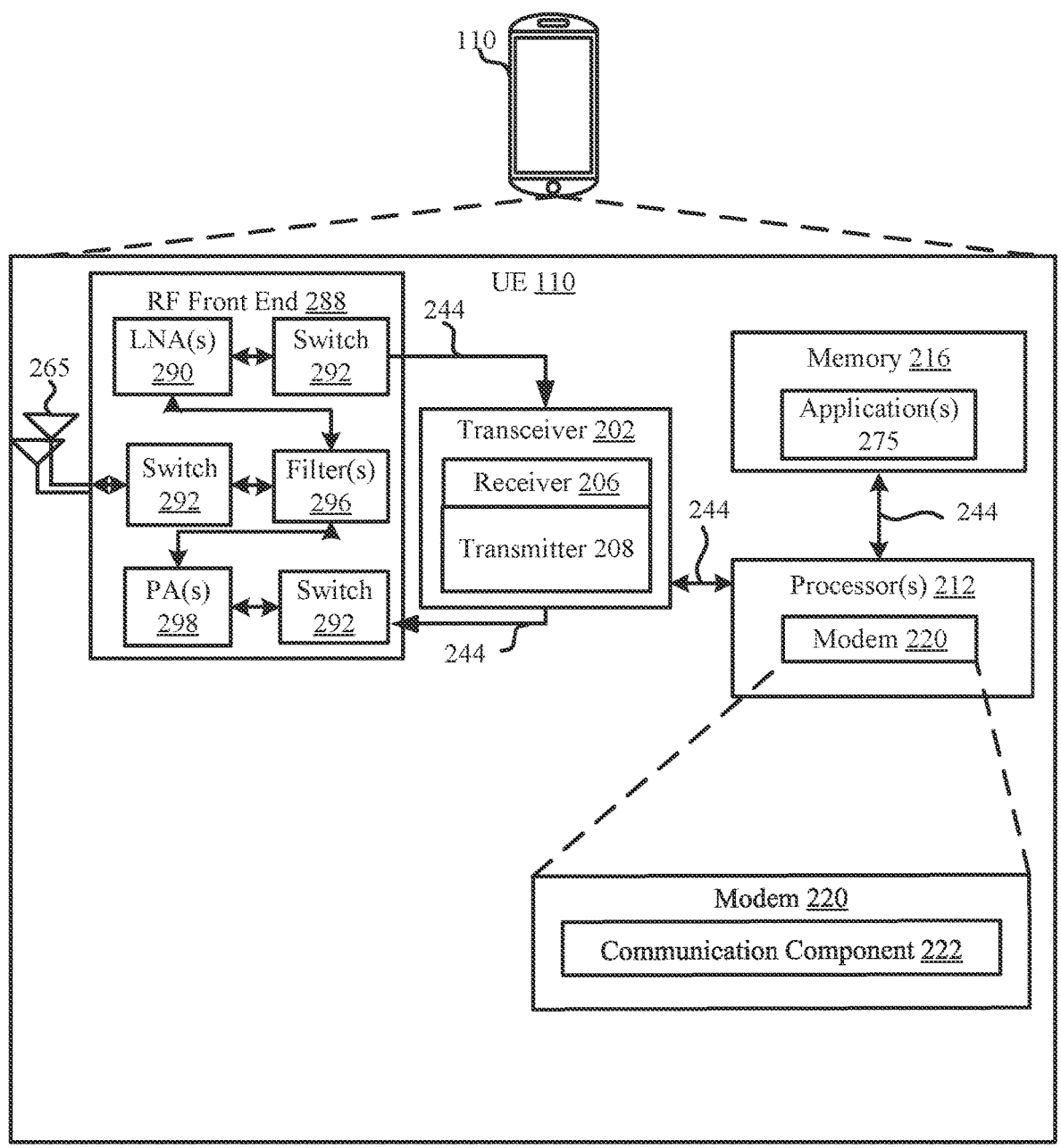
FIG. 2 is a schematic diagram of an example of a user equipment.

Referring to FIG. 2, one example of an implementation of the UE 110 may include a modem 220 having the communication component 222. In one implementation, the UE 110 may include a communication component 222 configured to communicate with the BS 105 via a cellular network, a Wi-Fi network, or other wireless and wired networks.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, and/or one or more of the subcomponents, and/or data associated therewith, when UE 110 is operating at least one processor 212 to execute the communication component 222, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
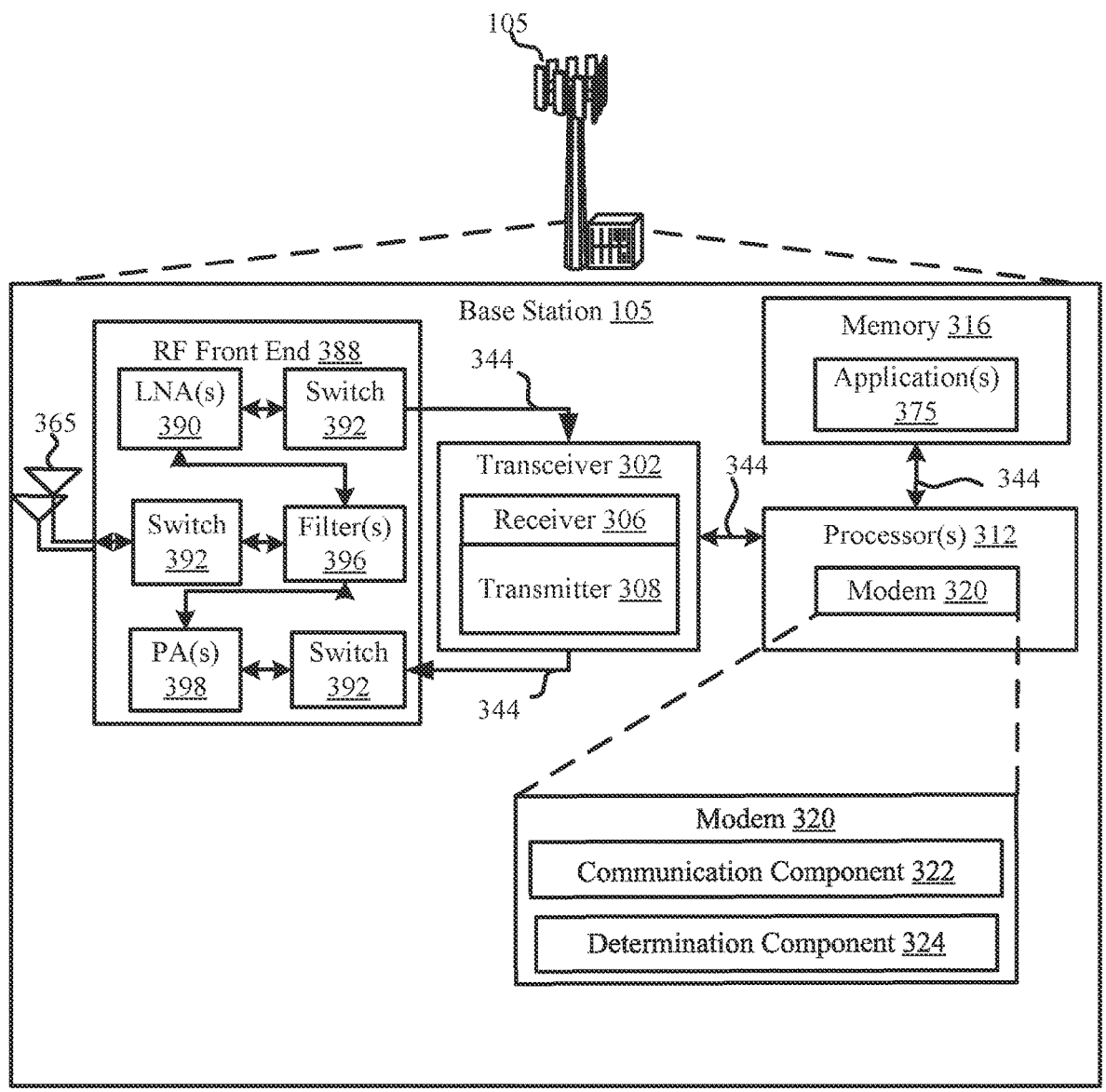
FIG. 3 is a schematic diagram of an example of a base station.

Referring to FIG. 3, one example of an implementation of the BS 105 may include a modem 320 having the communication component 322 and the determination component 324. In some implementations, the BS 105 may include a communication component 322 configured to communicate with the UE 110. The BS 105 may include a determination component 324 configured to determine the configuration of the RB set.

In some implementations, the BS 105 may include a variety of components, including components such as one or more processors 312 and memory 316 and transceiver 302 in communication via one or more buses 344, which may operate in conjunction with the modem 320 and the communication component 322 and/or the determination component 324 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322, the determination component 324, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, the determination component 324, and/or one or more of the subcomponents, and/or data associated therewith, when the BS 105 is operating at least one processor 312 to execute the communication component 322, the determination component 324, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
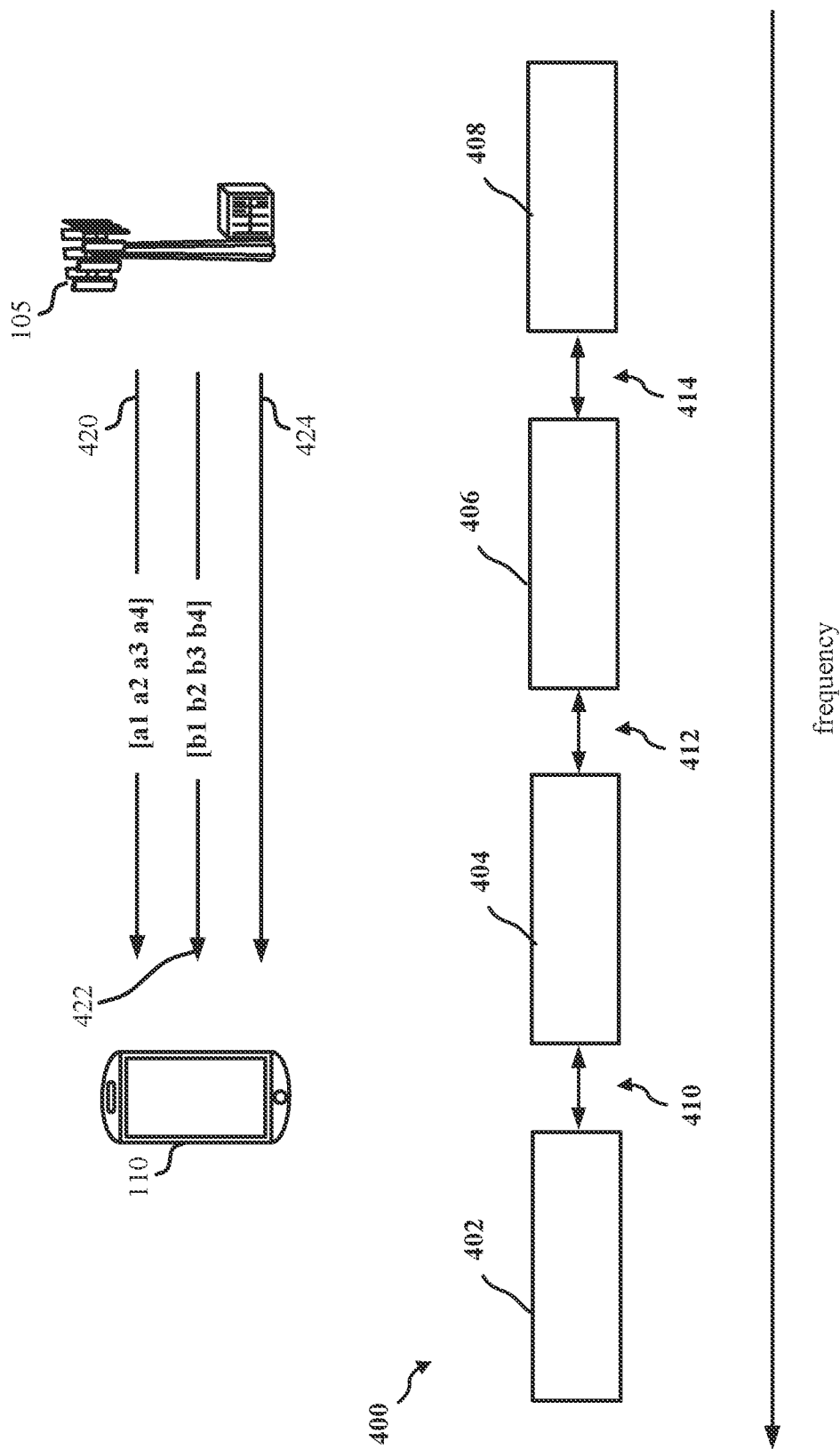
FIG. 4 is a block diagram of a first example of an environment for configuring resources of RB sets according to aspects of the present disclosure.

FIG. 4 is a block diagram of a first example of an environment for configuring resources of RB sets. A bandwidth part may include one or more RB sets. For a bandwidth part with more than one RB set, the RB sets may be separated by one or more guard bands. In some implementation, the environment may include a bandwidth part 400, which may include a first RB set 402, a second RB set 404, a third RB set 406, and a fourth RB set 408. The first RB set 402 and the second RB set 404 may be separated by a first guard band 410. The second RB set 404 and the third RB set 406 may be separated by a second guard band 412. The third RB set 406 and the fourth RB set 408 may be separated by a third guard band 414. The bandwidth part 400 may indicate resources in licensed or unlicensed bands for the UE 110 to transmit and/or receive information to/from the BS 105. The BS 105 may perform listen-before-talk (LBT) procedure to determine whether the resources of the bandwidth part 400 is available.

In certain implementations, the BS 105 may transmit a first set of bits (i.e., [a1 a2 a3 a4]) of a first bitmap 420 to indicate the availability of the resources in the bandwidth part 400. The bit a1 may correspond to the availability of the first RB set 402, the bit a2 may correspond to the availability of the second RB set 404, and so on. A bit value of "0" may indicate that the corresponding RB is not available, and a bit value of "1" may indicate that the corresponding RB is available. Alternatively, bit value of "1" may indicate that the corresponding RB is not available, and a bit value of "0" may indicate that the corresponding RB is available.

In an aspect of the present disclosure, the BS 105 may transmit a second set of bits (i.e., [b1 b2 b3 b4]) of a second bitmap 422 to indicate the transmission direction(s) associated with the resources in the bandwidth part 400. The bit b1 may correspond to the transmission direction of the first RB set 402, the bit b2 may correspond to the transmission direction of the second RB set 404, and so on. A bit value of "0" may indicate that the corresponding RB is allocated for uplink communication, and a bit value of "1" may indicate that the corresponding RB is allocated for downlink communication. Alternatively, bit value of "1" may indicate that the corresponding RB is allocated for downlink communication, and a bit value of "0" may indicate that the corresponding RB is allocated for uplink communication.

In one aspect of the present disclosure, the BS 105 may transmit an indication 424 to indicate the guard bands 410, 412, 414 between the RB sets 402, 404, 406, 408. In one aspect, the indication 424 may indicate whether each of the guard bands 410, 412, 414 is a downlink guard band (e.g., a guard band between two adjacent RB sets allocated for downlink communication), an uplink guard band (e.g., a guard band between two adjacent RB sets allocated for uplink communication), or a transition guard band (e.g., a guard band between two adjacent RB sets having one RB set allocated for uplink communication and another RB set allocated for downlink communication). The downlink guard band, the uplink guard band, and/or the transition guard band may have the same or different bandwidths. In some aspects, the indication 424 may include the starting frequency values and the end frequency values of the guard bands 410, 412, 414.

In alternatively implementations, the guard bands 410, 412, 414 may be fixed such that, regardless of the transmission directions of the RB sets 402, 404, 406, 408, the guard bands 410, 412, 414 may have the same bandwidth. As such, the indication 424 may exclude the bandwidth information associated with the guard bands 410, 412, 414. In other implementations, the guard bands 410, 412, 414 may be signaled by the BS 105 (e.g., via the indication 424). The BS 105 may transmit the indication 424 to indicate the same bandwidth or different bandwidth for the guard bands 410, 412, 414.

In an aspect of the present disclosure, if the UE 110 receives downlink information in two or more adjacent RB sets having the same transmission direction or transmits uplink information in two or more adjacent RB sets having the same transmission direction, the UE 110 may assume the one or more guard bands between the two or more adjacent RB sets to be zero, and/or receives downlink information or transmits uplink information via the one or more guard bands. For example, the BS 105 and/or the UE 110 may utilize the resources in the one or more guard bands to exchange information.

In a first example, the BS 105 may determine that the first RB set 402, the third RB set 406, and the fourth RB set 408 are available (e.g., based on the LBT procedure). The BS 105 may determine to allocate the first RB set 402 for uplink communication, and the third RB set 406 and the fourth RB set 408 for downlink communication. The second RB set 404 may be allocated for downlink communication by another BS 105 and/or for another UE 110. The BS 105 may allocate the first RB set 402 for uplink communication, and the third RB set 406 and the fourth RB set 408 for downlink communication. The BS 105 may transmit [1 0 1 1] as the first bitmap 420 to the UE 110 to indicate that the first RB set 402, the third RB set 406, and the fourth RB set 408 are available, and the second RB set 404 is unavailable. The BS 105 may transmit [0 1 1 1] as the second bitmap 422 to the UE 110 to indicate the transmit directions that the first RB set 402 is allocated for uplink communication, and the third RB set 406 and the fourth RB set 408 are allocated for downlink communication. In alternative implementations, the BS 105 may transmit [0 1 1] to indicate that the first RB set 402 is allocated for uplink communication, and the third RB set 406 and the fourth RB set 408 are allocated for downlink communication. The BS 105 may omit transmitting the bit associated with the second RB set 404 ("1") because the second RB set 404 is unavailable.

In some aspects, the BS 105 may transmit the indication 424 to the UE 110 indicating that the first guard band 410 is a transition guard band, and the second guard band 412 and the third guard band 414 are downlink guard bands.

In certain aspects of the present disclosure, the UE 110 may receive the first bitmap 420, the second bitmap 422, and/or the indication 424. Based on the first bitmap 420, the second bitmap 422, and/or the indication 424, the UE 110 may transmit uplink information via the first RB set 402. The UE 110 may receive downlink information via the third RB set 406 and the fourth RB set 408. The UE 110 may receive downlink information via the third guard band 414 (in addition to the third RB set 406 and/or the fourth RB set 408) because no guard band is used between two adjacent downlink RB sets (i.e., the third RB set 406 and the fourth RB set 408).

In a second example, the BS 105 may determine that the first RB set 402, the second RB set 404, and the third RB set 406 are available (e.g., based on the LBT procedure). The BS 105 may determine to allocate the first RB set 402 and the second RB set 404 for uplink communication, and the third RB set 406 for downlink communication. The fourth RB set 408 may be allocated for downlink communication by another BS 105 and/or for another UE 110. The BS 105 may allocate the first RB set 402 and the second RB set 404 for uplink communication, and the third RB set 406 for downlink communication. The BS 105 may transmit [1 1 1 0] as the first bitmap 420 to the UE 110 to indicate that the first RB set 402, the second RB set 404, and the third RB set 406 are available, and the fourth RB set 408 is unavailable. The BS 105 may transmit [0 0 1 1] as the second bitmap 422 to the UE 110 to indicate the transmit directions that the first RB set 402 and the second RB set 404 are allocated for uplink communication, and the third RB set 406 is allocated for downlink communication. In alternative implementations, the BS 105 may transmit [0 0 1] to indicate that the first RB set 402 and the second RB set 404 are allocated for uplink communication, and the third RB set 406 is allocated for downlink communication. The BS 105 may omit transmitting the bit associated with the fourth RB set 408 ("1") because the fourth RB set 408 is unavailable.

In some aspects, the BS 105 may transmit the indication 424 to the UE 110 indicating that the first guard band 410 is an uplink guard band, the second guard band 412 is a transition guard band, and the third guard band 414 is a downlink guard band.

In certain aspects of the present disclosure, the UE 110 may receive the first bitmap 420, the second bitmap 422, and/or the indication 424. Based on the first bitmap 420, the second bitmap 422, and/or the indication 424, the UE 110 may transmit uplink information via the first RB set 402, the second RB set 404, and the first guard band 410 because no guard band is used between two adjacent uplink RB sets having the same transmission direction (i.e., the first RB set 402 and the second RB set 404). The UE 110 may receive downlink information via the third RB set 406.

Figure 5:
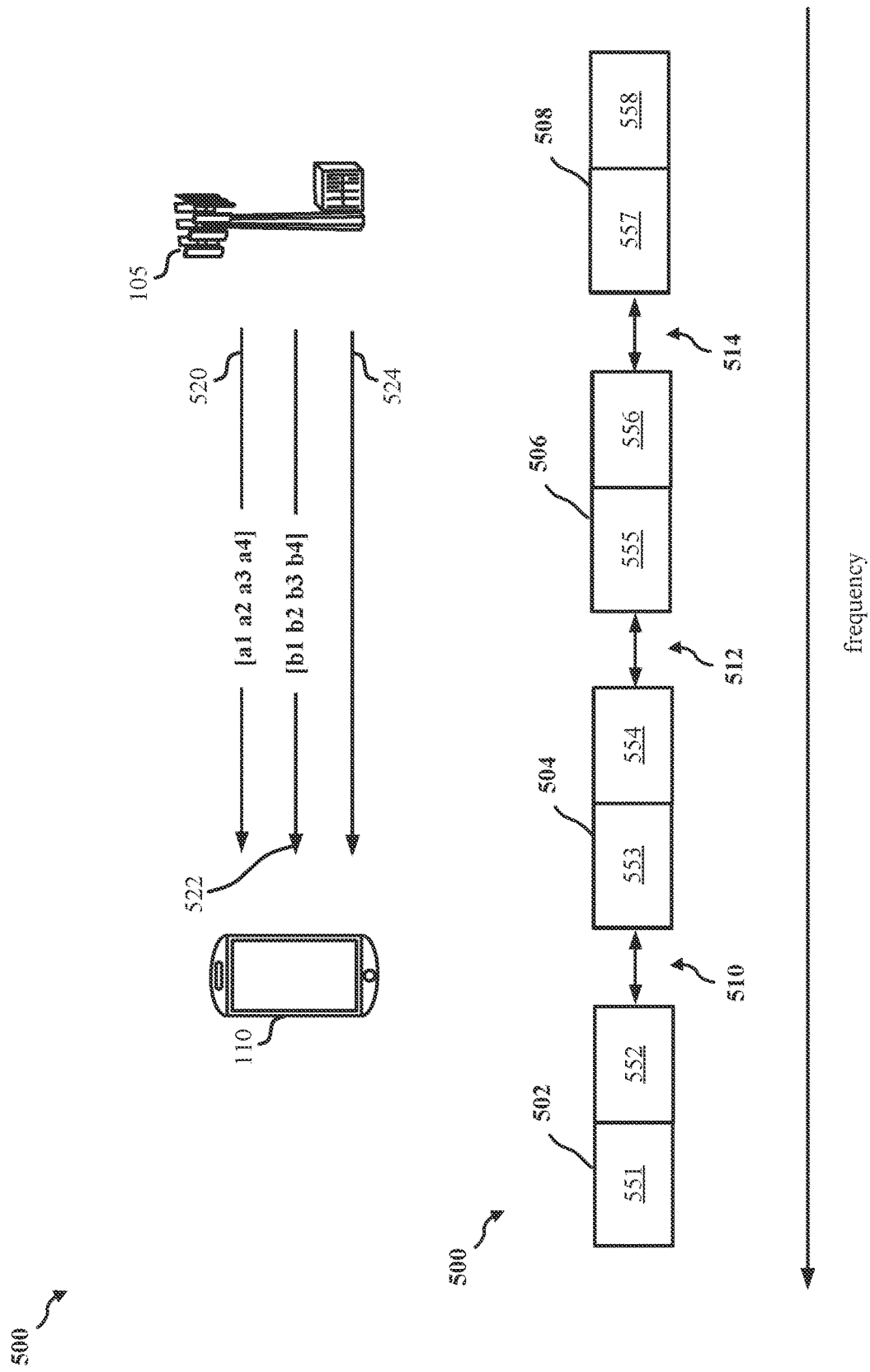
FIG. 5 is a block diagram of a second example of an environment for configuring resources of RB sets according to aspects of the present disclosure.

FIG. 5 is a block diagram of a second example of an environment for configuring resources of RB sets. A bandwidth part may include one or more RB sets. Each RB set may include one or more resources. For a bandwidth part with more than one RB set, the RB sets may be separated by one or more guard bands. In some implementation, the environment may include a bandwidth part 500 may include a first RB set 502, a second RB set 504, a third RB set 506, and a fourth RB set 508. The first RB set 502 and the second RB set 504 may be separated by a first guard band 510. The second RB set 504 and the third RB set 506 may be separated by a second guard band 512. The third RB set 506 and the fourth RB set 508 may be separated by a third guard band 514. The bandwidth part 500 may indicate resources in licensed or unlicensed bands for the UE 110 to transmit and/or receive information to/from the BS 105. The BS 105 may perform listen-before-talk (LBT) procedure to determine whether the resources of the bandwidth part 500 is available.

In an implementation, the first RB set 502 may include a first resource 551 and a second resource 552. The second RB set 504 may include a third resource 553 and a fourth resource 554. The third RB set 506 may include a fifth resource 555 and a sixth resource 556. The fourth RB set 508 may include a seventh resource 557 and an eighth resource 558. The resources of each RB set may be allocated for uplink, downlink, or uplink and downlink.

In certain implementations, the BS 105 may transmit a first set of bits (i.e., [a1 a2 a3 a4]) of a first bitmap 520 to indicate the availability of the resources in the bandwidth part 500. The bit a1 may correspond to the availability of the first RB set 502, the bit a2 may correspond to the availability of the second RB set 504, and so on. A bit value of "0" may indicate that the corresponding RB is not available, and a bit value of "1" may indicate that the corresponding RB is available. Alternatively, bit value of "1" may indicate that the corresponding RB is not available, and a bit value of "0" may indicate that the corresponding RB is available.

In an aspect of the present disclosure, the BS 105 may transmit a second set of bits (i.e., [b1-1 b1-2 b2-1 b2-2 b3-1 b3-2 b4-1 b4-2]) of a second bitmap 522 to indicate the transmission direction(s) associated with the resources in the bandwidth part 500. The bit b1-1 may correspond to the transmission direction of the first resource 551 of the first RB set 502, the bit b1-2 may correspond to the transmission direction of the second resource 552 of the first RB set 502, and so on. A bit value of "0" may indicate that the corresponding RB is allocated for uplink communication, and a bit value of "1" may indicate that the corresponding RB is allocated for downlink communication. Alternatively, bit value of "1" may indicate that the corresponding RB is allocated for downlink communication, and a bit value of "0" may indicate that the corresponding RB is allocated for uplink communication.

In one aspect of the present disclosure, the BS 105 may transmit an indication 524 to indicate the guard bands 510, 512, 514 between the RB sets 502, 504, 506, 508. In one aspect, the indication 524 may indicate whether each of the guard bands 510, 512, 514 is a downlink guard band (e.g., a guard band between two adjacent RB sets or two adjacent resources of RB sets allocated for downlink communication), an uplink guard band (e.g., a guard band between two adjacent RB sets or adjacent resources of RB sets allocated for uplink communication), or a transition guard band (e.g., a guard band between two adjacent RB sets or two adjacent resources of RB sets having one RB set or resource allocated for uplink communication and another RB set or resource allocated for downlink communication). The downlink guard band, the uplink guard band, and/or the transition guard band may have the same or different bandwidths. In some aspects, the indication 524 may include the starting frequency values and the end frequency values of the guard bands 510, 512, 514.

In alternatively implementations, the guard bands 510, 512, 514 may be fixed such that, regardless of the transmission directions of the RB sets 502, 504, 506, 508, the guard bands 510, 512, 514 may have the same bandwidth. As such, the indication 524 may exclude the bandwidth information associated with the guard bands 510, 512, 514. In other implementations, the guard bands 510, 512, 514 may be signaled by the BS 105 (e.g., via the indication 524). The BS 105 may transmit the indication 524 to indicate the same bandwidth or different bandwidth for the guard bands 510, 512, 514.

In an aspect of the present disclosure, if the UE 110 receives downlink information in two or more adjacent RB sets (or two or more adjacent resources) having the same transmission direction or transmits uplink information in two or more adjacent RB sets (or two or more adjacent resources) having the same transmission direction, the UE 110 may assume the one or more guard bands between the two or more adjacent RB sets (or the two or more adjacent resources) to be zero, and/or receives downlink information or transmits uplink information via the one or more guard bands. For example, the BS 105 and/or the UE 110 may utilize the resources in the one or more guard bands to exchange information in addition to the resources in the adjacent RB sets.

In an example, the BS 105 may determine that the first RB set 502, the second RB set 504, the third RB set 506, and the fourth RB set 508 are available (e.g., based on the LBT procedure). The BS 105 may determine to allocate the first resource 551 of first RB set 502, the fourth resource 554 of the second RB set 504, the third RB set 506, and the fourth RB set 508 for downlink communication. The BS 105 may determine to allocate the second resource 552 of the first RB set 502 and the third resource 553 of the second RB set 504 for uplink communication. The BS 105 may allocate the first resource 551 of first RB set 502, the fourth resource 554 of the second RB set 504, the third RB set 506, and the fourth RB set 508 for downlink communication. The BS 105 may allocate the second resource 552 of the first RB set 502 and the third resource 553 of the second RB set 504 for uplink communication. The BS 105 may transmit [1 1 1 1] as the first bitmap 520 to the UE 110 to indicate that the first RB set 502, the second RB set 504, the third RB set 506, and the fourth RB set 508 are available. The BS 105 may transmit [1 0 0 1 1 1 1 1] as the second bitmap 522 to the UE 110 to indicate the second resource 552 of the first RB set 502 and the third resource 553 of the second RB set 504 are allocated for uplink communication, and the first resource 551 of first RB set 502, the fourth resource 554 of the second RB set 504, the third RB set 506, and the fourth RB set 508 are allocated for downlink communication.

In some aspects, the BS 105 may transmit the indication 524 to the UE 110 indicating that the first guard band 510 is an uplink guard band, and the second guard band 512 and the third guard band 514 are downlink guard bands.

In certain aspects of the present disclosure, the BS 105 may allocate the resources 551-558 to increase the allocation of uplink guard bands and downlink guard bands, and to decrease the allocation of the transition guard bands.

In certain aspects of the present disclosure, the UE 110 may receive the first bitmap 520, the second bitmap 522, and/or the indication 524. The UE may transmit and/or receive information based on the received information. Based on the first bitmap 520, the second bitmap 522, and/or the indication 524, the UE 110 may transmit uplink information via the second resource 552 of the first RB set 502, the third resource 553 of the second RB set 504, and the first guard band 510 because no guard band is used between two adjacent resources having the same transmission direction. The UE 110 may receive downlink information via the first resource 551 of first RB set 502, the fourth resource 554 of the second RB set 504, the third RB set 506, and the fourth RB set 508. The UE 110 may receive downlink information via the second guard band 512 and the third guard band 514 because no guard band is used between two adjacent downlink RBs (i.e., the third RB set 506 and the fourth RB set 508) or two adjacent downlink resources (i.e., the fourth resource 554 and the fifth resource 555).

Figure 6:
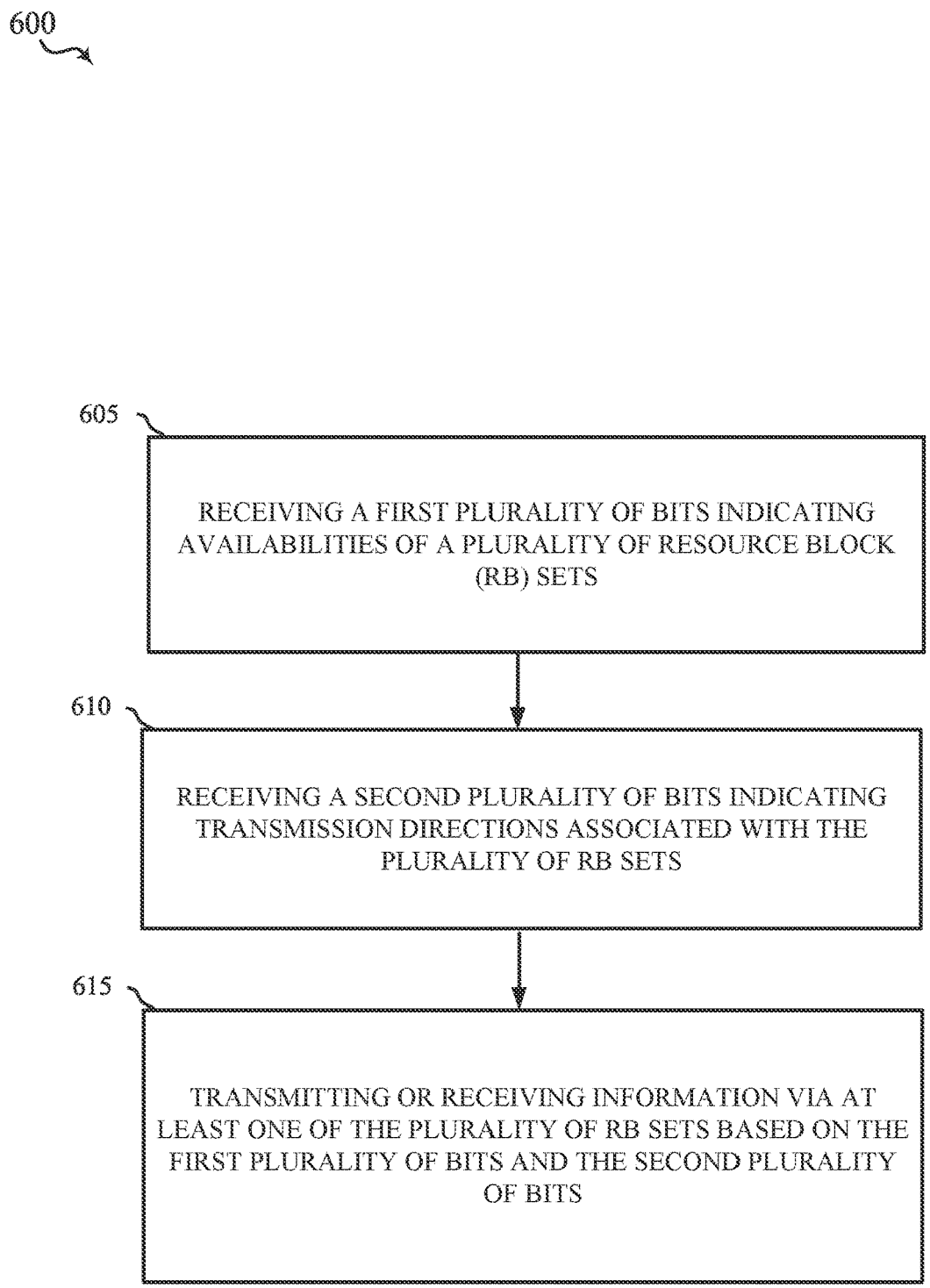
FIG. 6 is an example of a method for receiving configuration information for configuring RB sets according to aspects of the present disclosure.

FIG. 6 is an example of a method for receiving configuration information for configuring RB sets. For example, a method 600 may be performed by the one or more of the processor 212, the memory 216, the applications 275, the modem 220, the transceiver 202, the receiver 206, the transmitter 208, the RF front end 288, the communication component 222, and/or one or more other components of the UE 110 in the wireless communication network 100.

At block 605, the method 600 may receive a first plurality of bits indicating availabilities of a plurality of resource block (RB) sets. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive a first plurality of bits indicating availabilities of a plurality of resource block (RB) sets as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving a first plurality of bits indicating availabilities of a plurality of resource block (RB) sets.

At block 610, the method 600 may receive a second plurality of bits indicating transmission directions associated with the plurality of RB sets. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive a second plurality of bits indicating transmission directions associated with the plurality of RB sets as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving a second plurality of bits indicating transmission directions associated with the plurality of RB sets.

At block 615, the method 600 may transmit or receive information via at least one of the plurality of RB sets based on the first plurality of bits and the second plurality of bits. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit or receive information via at least one of the plurality of RB sets based on the first plurality of bits and the second plurality of bits. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265. Alternatively or additionally, the RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting or receiving information via at least one of the plurality of RB sets based on the first plurality of bits and the second plurality of bits.

Alternatively or additionally, the method 600 may further include any of the methods above, wherein each bit of the second plurality of bits indicates a transmission direction of a respective RB set of the plurality of RB sets.

Alternatively or additionally, the method 600 may further include any of the methods above, wherein transmitting or receiving the information comprises transmitting the information via two or more adjacent RB sets of the plurality of RB sets and one or more guard bands between the two or more adjacent RB sets, or receiving the information via two or more adjacent RB sets of the plurality of RB sets and one or more guard bands between the two or more adjacent RB sets.

Alternatively or additionally, the method 600 may further include any of the methods above, wherein each set of bits of the second plurality of bits indicates two or more transmission directions of a respective RB set of the plurality of RB sets.

Alternatively or additionally, the method 600 may further include any of the methods above, wherein a first set of bits of the second plurality of bits indicates a first transmission direction associated with a first portion of a first RB set of the plurality of RB sets and a second transmission direction associated with a second portion of the first RB set of the plurality of RB sets, and a second set of bits of the second plurality of bits indicates the second transmission direction associated with a third portion of a second RB set of the plurality of RB sets and the first transmission direction associated with a fourth portion of the second RB set of the plurality of RB sets, wherein the second portion of the first RB set is adjacent to the third portion of the second RB set.

Alternatively or additionally, the method 600 may further include any of the methods above, wherein transmitting or receiving the information comprises transmitting the information via the third portion of the first RB set, the third portion of the second RB set, and a guard band between the third portion of the first RB set and the third portion of the second RB set, or receiving the information via the third portion of the first RB set, the third portion of the second RB set, and a guard band between the third portion of the first RB set and the third portion of the second RB set.

Alternatively or additionally, the method 600 may further include any of the methods above, further comprising receiving guard band position information indicating frequency positions of at least one guard band between adjacent RB sets of the plurality of RB sets.

Alternatively or additionally, the method 600 may further include any of the methods above, wherein the at least one guard band comprises one or more of a downlink guard band that delimits two adjacent downlink RB sets, an uplink guard band that delimits two adjacent uplink RB sets, or a transition guard band that delimits a downlink RB set and an uplink RB set.

Alternatively or additionally, the method 600 may further include any of the methods above, wherein the at least one guard band comprises one or more fixed guard band Alternatively or additionally, the method 600 may further include any of the methods above, further comprising receiving guard band configuration information indicating one or more bandwidth of the at least one guard band.

Figure 7:
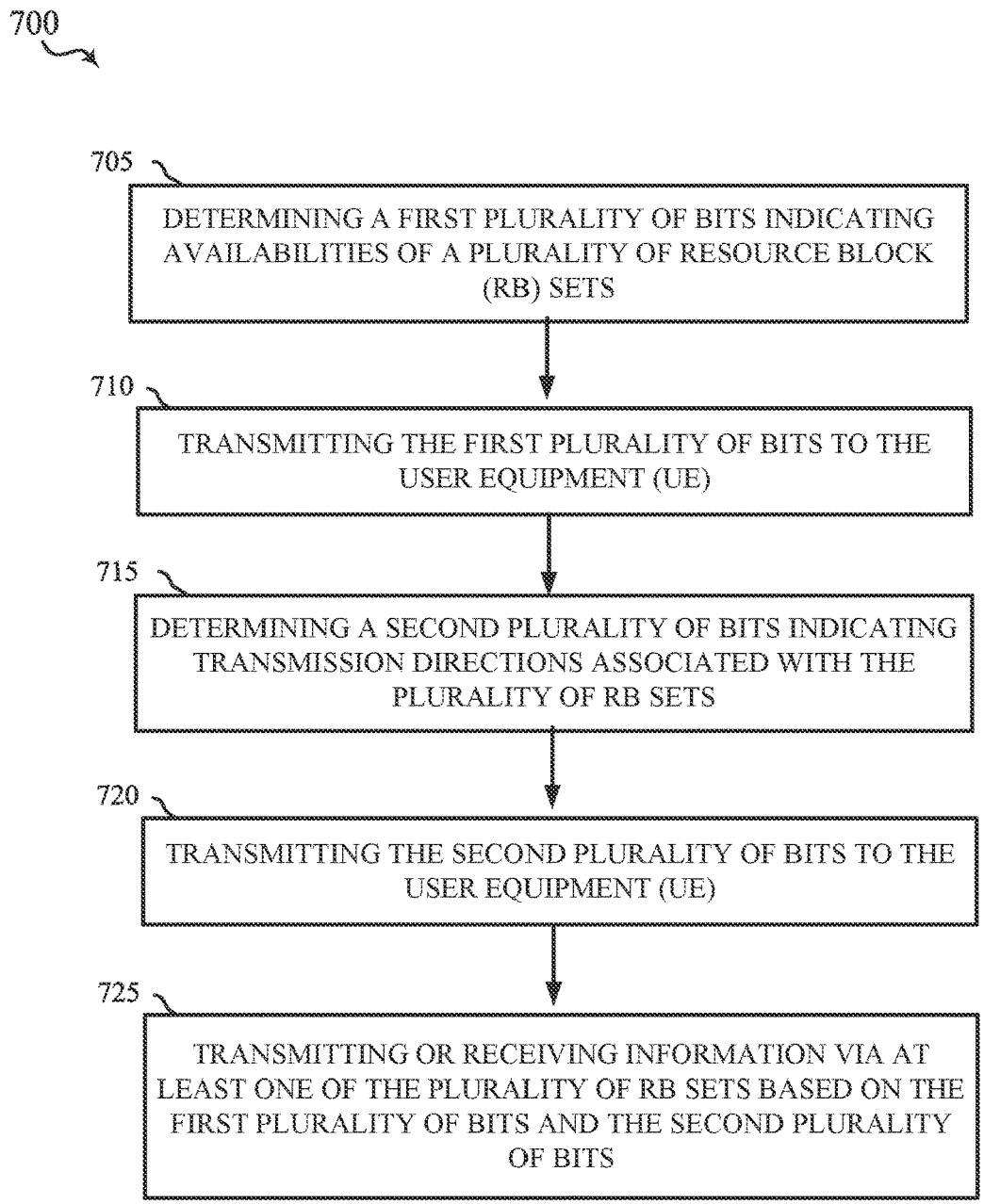
FIG. 7 is an example of a method for configuring RB sets according to aspects of the present disclosure.

FIG. 7 is an example of a method for configuring RB sets. For example, a method 700 may be performed by the one or more of the processor 312, the memory 316, the applications 375, the modem 320, the transceiver 302, the receiver 306, the transmitter 308, the RF front end 388, the communication component 322, the determination component 324, and/or one or more other components of the BS 105 in the wireless communication network 100.

At block 705, the method 700 may determine a first plurality of bits indicating availabilities of a plurality of resource block (RB) sets. For example, the determination component 324, the processor 312, the memory 316, the modem 320, and/or the applications 375 of the BS 105 may determine a first plurality of bits indicating availabilities of a plurality of resource block (RB) sets as described above.

In certain implementations, the determination component 324, the processor 312, the memory 316, the modem 320, and/or the applications 375 of the BS 105 may be configured to and/or may define means for determining a first plurality of bits indicating availabilities of a plurality of resource block (RB) sets.

At block 710, the method 700 may transmit the first plurality of bits indicating availabilities of a plurality of resource block (RB) sets. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit the first plurality of bits indicating availabilities of a plurality of resource block (RB) sets as described above. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting the first plurality of bits indicating availabilities of a plurality of resource block (RB) sets.

At block 715, the method 700 may determine a second plurality of bits indicating transmission directions associated with the plurality of RB sets. For example, the determination component 324, the processor 312, the memory 316, the modem 320, and/or the applications 375 of the BS 105 may determine a second plurality of bits indicating transmission directions associated with the plurality of RB sets as described above.

In certain implementations, the determination component 324, the processor 312, the memory 316, the modem 320, and/or the applications 375 of the BS 105 may be configured to and/or may define means for determining a second plurality of bits indicating transmission directions associated with the plurality of RB sets.

At block 720, the method 700 may transmit or receive the second plurality of bits indicating transmission directions associated with the plurality of RB sets. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit or receive the second plurality of bits indicating transmission directions associated with the plurality of RB sets as described above. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting or receiving the second plurality of bits indicating transmission directions associated with the plurality of RB sets.

At block 725, the method 700 may transmit information via at least one of the plurality of RB sets based on the first plurality of bits and the second plurality of bits. For example, the communication component 322, the transceiver 302, the receiver 306, the transmitter 308, the RF front end 388, the subcomponents of the RF front end 388, the processor 312, the memory 316, the modem 320, and/or the applications 375 of the UE 110 may transmit information via at least one of the plurality of RB sets based on the first plurality of bits and the second plurality of bits. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365. Alternatively or additionally, the RF front end 388 may receive the electrical signals converted from electro-magnetic signals. The RF front end 388 may filter and/or amplify the electrical signals. The transceiver 302 or the receiver 306 may convert the electrical signals to digital signals, and send the digital signals to the communication component 322.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting or receiving information via at least one of the plurality of RB sets based on the first plurality of bits and the second plurality of bits.

Alternatively or additionally, the method 700 may further include any of the methods above, wherein each bit of the second plurality of bits indicates a transmission direction of a respective RB set of the plurality of RB sets.

Alternatively or additionally, the method 700 may further include any of the methods above, wherein transmitting or receiving the information comprises transmitting the information via two or more adjacent RB sets of the plurality of RB sets and one or more guard bands between the two or more adjacent RB sets, or receiving the information via two or more adjacent RB sets of the plurality of RB sets and one or more guard bands between the two or more adjacent RB sets.

Alternatively or additionally, the method 700 may further include any of the methods above, wherein each set of bits of the second plurality of bits indicates two or more transmission directions of a respective RB set of the plurality of RB sets.

Alternatively or additionally, the method 700 may further include any of the methods above, wherein a first set of bits of the second plurality of bits indicates a first transmission direction associated with a first portion of a first RB set of the plurality of RB sets and a second transmission direction associated with a second portion of the first RB set of the plurality of RB sets, and a second set of bits of the second plurality of bits indicates the second transmission direction associated with a third portion of a second RB set of the plurality of RB sets and the first transmission direction associated with a fourth portion of the second RB set of the plurality of RB sets, wherein the second portion of the first RB set is adjacent to the third portion of the second RB set.

Alternatively or additionally, the method 700 may further include any of the methods above, wherein transmitting or receiving the information comprises transmitting the information via the third portion of the first RB set, the third portion of the second RB set, and a guard band between the third portion of the first RB set and the third portion of the second RB set, or receiving the information via the third portion of the first RB set, the third portion of the second RB set, and a guard band between the third portion of the first RB set and the third portion of the second RB set.

Alternatively or additionally, the method 700 may further include any of the methods above, further comprising transmitting guard band position information indicating frequency positions of at least one guard band between adjacent RB sets of the plurality of RB sets.

Alternatively or additionally, the method 700 may further include any of the methods above, wherein the at least one guard band comprises one or more of a downlink guard band that delimits two adjacent downlink RB sets, an uplink guard band that delimits two adjacent uplink RB sets, or a transition guard band that delimits a downlink RB set and an uplink RB set.

Alternatively or additionally, the method 700 may further include any of the methods above, wherein the at least one guard band comprises one or more fixed guard band Alternatively or additionally, the method 700 may further include any of the methods above, further comprising transmitting guard band configuration information indicating one or more bandwidth of the at least one guard band.

ADDITIONAL IMPLEMENTATIONS

Aspects of the present disclosure include methods by a user equipment (UE) for receiving a first plurality of bits indicating availabilities of a plurality of resource block (RB) sets, receiving a second plurality of bits indicating transmission directions associated with the plurality of RB sets, and transmitting or receiving information via at least one of the plurality of RB sets based on the first plurality of bits and the second plurality of bits.

Any of the methods above, wherein each bit of the second plurality of bits indicates a transmission direction of a respective RB set of the plurality of RB sets.

Any of the methods above, wherein transmitting or receiving the information comprises transmitting the information via two or more adjacent RB sets of the plurality of RB sets and one or more guard bands between the two or more adjacent RB sets, or receiving the information via two or more adjacent RB sets of the plurality of RB sets and one or more guard bands between the two or more adjacent RB sets.

Any of the methods above, wherein each set of bits of the second plurality of bits indicates two or more transmission directions of a respective RB set of the plurality of RB sets.

Any of the methods above, wherein a first set of bits of the second plurality of bits indicates a first transmission direction associated with a first portion of a first RB set of the plurality of RB sets and a second transmission direction associated with a second portion of the first RB set of the plurality of RB sets, and a second set of bits of the second plurality of bits indicates the second transmission direction associated with a third portion of a second RB set of the plurality of RB sets and the first transmission direction associated with a fourth portion of the second RB set of the plurality of RB sets, wherein the second portion of the first RB set is adjacent to the third portion of the second RB set.

Any of the methods above, wherein transmitting or receiving the information comprises transmitting the information via the third portion of the first RB set, the third portion of the second RB set, and a guard band between the third portion of the first RB set and the third portion of the second RB set, or receiving the information via the third portion of the first RB set, the third portion of the second RB set, and a guard band between the third portion of the first RB set and the third portion of the second RB set.

Any of the methods above, further comprising receiving guard band position information indicating frequency positions of at least one guard band between adjacent RB sets of the plurality of RB sets.

Any of the methods above, wherein the at least one guard band comprises one or more of a downlink guard band that delimits two adjacent downlink RB sets, an uplink guard band that delimits two adjacent uplink RB sets, or a transition guard band that delimits a downlink RB set and an uplink RB set.

Any of the methods above, wherein the at least one guard band comprises one or more fixed guard band Any of the methods above, further comprising receiving guard band configuration information indicating one or more bandwidth of the at least one guard band.

Other aspects of the present disclosure include a user equipment (UE) having a memory comprising instructions, a transceiver, and one or more processors operatively coupled with the memory and the transceiver, the one or more processors configured to execute instructions in the memory to receive a first plurality of bits indicating availabilities of a plurality of resource block (RB) sets, receive a second plurality of bits indicating transmission directions associated with the plurality of RB sets, and transmit information via at least one of the plurality of RB sets based on the first plurality of bits and the second plurality of bits.

Any of the UEs above, wherein each bit of the second plurality of bits indicates a transmission direction of a respective RB set of the plurality of RB sets.

Any of the UEs above, wherein transmitting or receiving the information comprises transmitting the information via two or more adjacent RB sets of the plurality of RB sets and one or more guard bands between the two or more adjacent RB sets, or receiving the information via two or more adjacent RB sets of the plurality of RB sets and one or more guard bands between the two or more adjacent RB sets.

Any of the UEs above, wherein each set of bits of the second plurality of bits indicates two or more transmission directions of a respective RB set of the plurality of RB sets.

Any of the UEs above, wherein a first set of bits of the second plurality of bits indicates a first transmission direction associated with a first portion of a first RB set of the plurality of RB sets and a second transmission direction associated with a second portion of the first RB set of the plurality of RB sets, and a second set of bits of the second plurality of bits indicates the second transmission direction associated with a third portion of a second RB set of the plurality of RB sets and the first transmission direction associated with a fourth portion of the second RB set of the plurality of RB sets, wherein the second portion of the first RB set is adjacent to the third portion of the second RB set.

Any of the UEs above, wherein transmitting or receiving the information comprises transmitting the information via the third portion of the first RB set, the third portion of the second RB set, and a guard band between the third portion of the first RB set and the third portion of the second RB set, or receiving the information via the third portion of the first RB set, the third portion of the second RB set, and a guard band between the third portion of the first RB set and the third portion of the second RB set.

Any of the UEs above, wherein the one or more processors are further configured to receive guard band position information indicating frequency positions of at least one guard band between adjacent RB sets of the plurality of RB sets.

Any of the UEs above, wherein the at least one guard band comprises one or more of a downlink guard band that delimits two adjacent downlink RB sets, an uplink guard band that delimits two adjacent uplink RB sets, or a transition guard band that delimits a downlink RB set and an uplink RB set.

Any of the UEs above, wherein the at least one guard band comprises one or more fixed guard band Any of the UEs above, wherein the one or more processors are further configured to receive guard band configuration information indicating one or more bandwidth of the at least one guard band.

An aspect of the present disclosure includes a user equipment (UE) including means for receiving a first plurality of bits indicating availabilities of a plurality of resource block (RB) sets, means for receiving a second plurality of bits indicating transmission directions associated with the plurality of RB sets, and means for transmitting or receiving information via at least one of the plurality of RB sets based on the first plurality of bits and the second plurality of bits.

Any of the UEs above, wherein each bit of the second plurality of bits indicates a transmission direction of a respective RB set of the plurality of RB sets.

Any of the UEs above, wherein means for transmitting or receiving the information comprises means for transmitting the information via two or more adjacent RB sets of the plurality of RB sets and one or more guard bands between the two or more adjacent RB sets, or means for receiving the information via two or more adjacent RB sets of the plurality of RB sets and one or more guard bands between the two or more adjacent RB sets.

Any of the UEs above, wherein each set of bits of the second plurality of bits indicates two or more transmission directions of a respective RB set of the plurality of RB sets.

Any of the UEs above, wherein a first set of bits of the second plurality of bits indicates a first transmission direction associated with a first portion of a first RB set of the plurality of RB sets and a second transmission direction associated with a second portion of the first RB set of the plurality of RB sets, and a second set of bits of the second plurality of bits indicates the second transmission direction associated with a third portion of a second RB set of the plurality of RB sets and the first transmission direction associated with a fourth portion of the second RB set of the plurality of RB sets, wherein the second portion of the first RB set is adjacent to the third portion of the second RB set.

Any of the UEs above, wherein means for transmitting or receiving the information comprises means for transmitting the information via the third portion of the first RB set, the third portion of the second RB set, and a guard band between the third portion of the first RB set and the third portion of the second RB set, or means for receiving the information via the third portion of the first RB set, the third portion of the second RB set, and a guard band between the third portion of the first RB set and the third portion of the second RB set.

Any of the UEs above, further comprising means for receiving guard band position information indicating frequency positions of at least one guard band between adjacent RB sets of the plurality of RB sets.

Any of the UEs above, wherein the at least one guard band comprises one or more of a downlink guard band that delimits two adjacent downlink RB sets, an uplink guard band that delimits two adjacent uplink RB sets, or a transition guard band that delimits a downlink RB set and an uplink RB set.

Any of the UEs above, wherein the at least one guard band comprises one or more fixed guard band Any of the UEs above, further comprising means for receiving guard band configuration information indicating one or more bandwidth of the at least one guard band.

Some aspects of the present disclosure include non-transitory computer readable media having instructions stored therein that, when executed by one or more processors of a user equipment (UE), cause the one or more processors to receive a first plurality of bits indicating availabilities of a plurality of resource block (RB) sets, receive a second plurality of bits indicating transmission directions associated with the plurality of RB sets, and transmit information via at least one of the plurality of RB sets based on the first plurality of bits and the second plurality of bits.

Any of the non-transitory computer readable media above, wherein each bit of the second plurality of bits indicates a transmission direction of a respective RB set of the plurality of RB sets.

Any of the non-transitory computer readable media above, wherein the instructions for transmitting or receiving the information comprises instructions, when executed by the one or more processors, cause the one or more processors to transmitting the information via two or more adjacent RB sets of the plurality of RB sets and one or more guard bands between the two or more adjacent RB sets, or receiving the information via two or more adjacent RB sets of the plurality of RB sets and one or more guard bands between the two or more adjacent RB sets.

Any of the non-transitory computer readable media above, wherein each set of bits of the second plurality of bits indicates two or more transmission directions of a respective RB set of the plurality of RB sets.

Any of the non-transitory computer readable media above, wherein a first set of bits of the second plurality of bits indicates a first transmission direction associated with a first portion of a first RB set of the plurality of RB sets and a second transmission direction associated with a second portion of the first RB set of the plurality of RB sets, and a second set of bits of the second plurality of bits indicates the second transmission direction associated with a third portion of a second RB set of the plurality of RB sets and the first transmission direction associated with a fourth portion of the second RB set of the plurality of RB sets, wherein the second portion of the first RB set is adjacent to the third portion of the second RB set.

Any of the non-transitory computer readable media above, wherein the instructions for transmitting or receiving the information comprises instructions, when executed by the one or more processors, cause the one or more processors to transmitting the information via the third portion of the first RB set, the third portion of the second RB set, and a guard band between the third portion of the first RB set and the third portion of the second RB set, or receiving the information via the third portion of the first RB set, the third portion of the second RB set, and a guard band between the third portion of the first RB set and the third portion of the second RB set.

Any of the non-transitory computer readable media above, further comprising instructions, when executed by the one or more processors, cause the one or more processors to receive guard band position information indicating frequency positions of at least one guard band between adjacent RB sets of the plurality of RB sets.

Any of the non-transitory computer readable media above, wherein the at least one guard band comprises one or more of a downlink guard band that delimits two adjacent downlink RB sets, an uplink guard band that delimits two adjacent uplink RB sets, or a transition guard band that delimits a downlink RB set and an uplink RB set.

Any of the non-transitory computer readable media above, wherein the at least one guard band comprises one or more fixed guard band Any of the non-transitory computer readable media above, further comprising instructions, when executed by the one or more processors, cause the one or more processors to receive guard band configuration information indicating one or more bandwidth of the at least one guard band.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
   receiving a first plurality of bits indicating availabilities of a plurality of resource block (RB) sets;
   receiving a second plurality of bits indicating transmission directions associated with the plurality of RB sets, wherein each bit of the second plurality of bits indicates a transmission direction of a respective RB set of the plurality of RB sets; and
   transmitting or receiving information via at least one of the plurality of RB sets based on the first plurality of bits and the second plurality of bits.

2. The method of claim 1, wherein transmitting or receiving the information comprises:
   transmitting the information via two or more adjacent RB sets of the plurality of RB sets and one or more guard bands between the two or more adjacent RB sets; or
   receiving the information via two or more adjacent RB sets of the plurality of RB sets and one or more guard bands between the two or more adjacent RB sets.

3. The method of claim 1, wherein:
   each set of bits of the second plurality of bits indicates two or more transmission directions of a respective RB set of the plurality of RB sets.

4. The method of claim 1, wherein:
   a first set of bits of the second plurality of bits indicates a first transmission direction associated with a first portion of a first RB set of the plurality of RB sets and a second transmission direction associated with a second portion of the first RB set of the plurality of RB sets; and
   a second set of bits of the second plurality of bits indicates the second transmission direction associated with a third portion of a second RB set of the plurality of RB sets and the first transmission direction associated with a fourth portion of the second RB set of the plurality of RB sets, wherein the second portion of the first RB set is adjacent to the third portion of the second RB set.

5. The method of claim 4, wherein transmitting or receiving the information comprises:
   transmitting the information via the third portion of the first RB set, the third portion of the second RB set, and a guard band between the third portion of the first RB set and the third portion of the second RB set; or
   receiving the information via the third portion of the first RB set, the third portion of the second RB set, and a guard band between the third portion of the first RB set and the third portion of the second RB set.

6. The method of claim 1, further comprising:
   receiving guard band position information indicating frequency positions of at least one guard band between adjacent RB sets of the plurality of RB sets.

7. The method of claim 6, wherein:
   the at least one guard band comprises one or more of a downlink guard band that delimits two adjacent downlink RB sets, an uplink guard band that delimits two adjacent uplink RB sets, or a transition guard band that delimits a downlink RB set and an uplink RB set.

8. The method of claim 6, wherein:
   the at least one guard band comprises one or more fixed guard band.

9. The method of claim 6, further comprising:
   receiving guard band configuration information indicating one or more bandwidth of the at least one guard band.

10. A user equipment (UE), comprising:
    a memory comprising instructions;
    a transceiver; and
    one or more processors operatively coupled with the memory and the transceiver, the one or more processors configured to execute instructions in the memory to:
       receive a first plurality of bits indicating availabilities of a plurality of resource block (RB) sets;
       receive a second plurality of bits indicating transmission directions associated with the plurality of RB sets, wherein each bit of the second plurality of bits indicates a transmission direction of a respective RB set of the plurality of RB sets; and
       transmit or receive information via at least one of the plurality of RB sets based on the first plurality of bits and the second plurality of bits.

11. The UE of claim 10, wherein transmitting or receiving the information comprises:
    transmitting the information via two or more adjacent RB sets of the plurality of RB sets and one or more guard bands between the two or more adjacent RB sets; or
    receiving the information via two or more adjacent RB sets of the plurality of RB sets and one or more guard bands between the two or more adjacent RB sets.

12. The UE of claim 10, wherein:
    each set of bits of the second plurality of bits indicates two or more transmission directions of a respective RB set of the plurality of RB sets.

13. The UE of claim 12, wherein:
    a first set of bits of the second plurality of bits indicates a first transmission direction associated with a first portion of a first RB set of the plurality of RB sets and a second transmission direction associated with a second portion of the first RB set of the plurality of RB sets; and
    a second set of bits of the second plurality of bits indicates the second transmission direction associated with a third portion of a second RB set of the plurality of RB sets and the first transmission direction associated with a fourth portion of the second RB set of the plurality of RB sets, wherein the second portion of the first RB set is adjacent to the third portion of the second RB set.

14. The UE of claim 13, wherein transmitting or receiving the information comprises:
transmitting the information via the third portion of the first RB set, the third portion of the second RB set, and a guard band between the third portion of the first RB set and the third portion of the second RB set; or
receiving the information via the third portion of the first RB set, the third portion of the second RB set, and a guard band between the third portion of the first RB set and the third portion of the second RB set.

15. The UE of claim 10, wherein the one or more processors are further configured to:
receive guard band position information indicating frequency positions of at least one guard band between adjacent RB sets of the plurality of RB sets.

16. The UE of claim 15, wherein:
the at least one guard band comprises one or more of a downlink guard band that delimits two adjacent downlink RB sets, an uplink guard band that delimits two adjacent uplink RB sets, or a transition guard band that delimits a downlink RB set and an uplink RB set.

17. The UE of claim 15, wherein:
the at least one guard band comprises one or more fixed guard band.

18. The UE of claim 15, wherein the one or more processors are further configured to:
receive guard band configuration information indicating one or more bandwidth of the at least one guard band.

19. A non-transitory computer readable medium having instructions stored therein that, when executed by one or more processors of a user equipment (UE), cause the one or more processors to:
receive a first plurality of bits indicating availabilities of a plurality of resource block (RB) sets;
receive a second plurality of bits indicating transmission directions associated with the plurality of RB sets, wherein each bit of the second plurality of bits indicates a transmission direction of a respective RB set of the plurality of RB sets; and
transmit or receive information via at least one of the plurality of RB sets based on the first plurality of bits and the second plurality of bits.

20. The non-transitory computer readable medium of claim 19, wherein the instructions for transmitting or receiving the information comprises instructions, when executed by the one or more processors, cause the one or more processors to:
transmitting the information via two or more adjacent RB sets of the plurality of RB sets and one or more guard bands between the two or more adjacent RB sets; or
receiving the information via two or more adjacent RB sets of the plurality of RB sets and one or more guard bands between the two or more adjacent RB sets.

21. The non-transitory computer readable medium of claim 19, wherein:
each set of bits of the second plurality of bits indicates two or more transmission directions of a respective RB set of the plurality of RB sets.

22. The non-transitory computer readable medium of claim 21, wherein:
a first set of bits of the second plurality of bits indicates a first transmission direction associated with a first portion of a first RB set of the plurality of RB sets and a second transmission direction associated with a second portion of the first RB set of the plurality of RB sets; and
a second set of bits of the second plurality of bits indicates the second transmission direction associated with a third portion of a second RB set of the plurality of RB sets and the first transmission direction associated with a fourth portion of the second RB set of the plurality of RB sets, wherein the second portion of the first RB set is adjacent to the third portion of the second RB set.

23. The non-transitory computer readable medium of claim 22, wherein the instructions for transmitting or receiving the information comprises instructions, when executed by the one or more processors, cause the one or more processors to:
transmitting the information via the third portion of the first RB set, the third portion of the second RB set, and a guard band between the third portion of the first RB set and the third portion of the second RB set; or
receiving the information via the third portion of the first RB set, the third portion of the second RB set, and a guard band between the third portion of the first RB set and the third portion of the second RB set.

24. The non-transitory computer readable medium of claim 19, further comprising instructions, when executed by the one or more processors, cause the one or more processors to:
receive guard band position information indicating frequency positions of at least one guard band between adjacent RB sets of the plurality of RB sets.

25. The non-transitory computer readable medium of claim 24, wherein:
the at least one guard band comprises one or more of a downlink guard band that delimits two adjacent downlink RB sets, an uplink guard band that delimits two adjacent uplink RB sets, or a transition guard band that delimits a downlink RB set and an uplink RB set.

26. The non-transitory computer readable medium of claim 24, wherein:
the at least one guard band comprises one or more fixed guard band.

27. A user equipment (UE), comprising:
means for receiving a first plurality of bits indicating availabilities of a plurality of resource block (RB) sets;
means for receiving a second plurality of bits indicating transmission directions associated with the plurality of RB sets, wherein each bit of the second plurality of bits indicates a transmission direction of a respective RB set of the plurality of RB sets; and
means for transmitting or receiving information via at least one of the plurality of RB sets based on the first plurality of bits and the second plurality of bits.

* * * * *